United States Patent
Jaffry et al.

(10) Patent No.: US 12,323,832 B2
(45) Date of Patent: Jun. 3, 2025

(54) MOBILE NETWORK ANOMALY CLASSIFICATION USING MULTI-DOMAIN DATA CORRELATION

(71) Applicant: Dell Products L.P., Round Rock, TX (US)

(72) Inventors: Syed Shan-e-Raza Jaffry, Ottawa (CA); Afshin Sahabi, Ottawa (CA); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 417 days.

(21) Appl. No.: 17/822,609

(22) Filed: Aug. 26, 2022

(65) Prior Publication Data

US 2024/0073713 A1   Feb. 29, 2024

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | |
|---|---|---|---|
| 2016/0254944 A1* | 9/2016 | Larsson | H04L 41/14 370/230 |
| 2017/0094537 A1* | 3/2017 | Yang | H04L 41/0631 |
| 2017/0201897 A1* | 7/2017 | Yang | H04L 43/16 |
| 2018/0285320 A1* | 10/2018 | Yang | G06N 7/01 |
| 2020/0084087 A1* | 3/2020 | Sharma | H04W 24/08 |
| 2021/0258866 A1* | 8/2021 | Chou | H04W 48/16 |
| 2022/0070701 A1* | 3/2022 | Bedekar | H04W 24/08 |
| 2022/0167188 A1* | 5/2022 | Soulhi | G06N 10/60 |
| 2022/0173965 A1* | 6/2022 | Martin | H04L 41/0813 |
| 2022/0210708 A1* | 6/2022 | Parekh | H04W 36/0058 |
| 2023/0069604 A1* | 3/2023 | Subramani | G06F 9/547 |

(Continued)

OTHER PUBLICATIONS

Oran Alliance, "Transforming Radio Access Networks Towards Open, Intelligent, Virtualized and Fully Interoperable RAN," https://www.o-ran.org, Retrieved from the Internet: Aug. 2, 2022, 8 Pages.

(Continued)

*Primary Examiner* — Lonnie V Sweet
(74) *Attorney, Agent, or Firm* — Amin, Turocy & Watson, LLP

(57) ABSTRACT

Generally provided is a radio system that can comprise an upper-level controller that analyzes data comprising first data from a radio network source and second data from an external source that is disposed external to the radio network, and a lower-level controller that is responsive to and provided at a lower level of hierarchy of the radio network than the upper-level controller, where the lower-level controller identifies the first data from the radio network source, and where the upper-level controller classifies, based on the analysis, whether an anomaly, determined to be occurring in a radio network comprising the radio system, is caused by the radio network. The upper-level controller can correlate the first data from the radio network source and the second data from the external source to metrics defining the anomaly.

20 Claims, 10 Drawing Sheets

(56) References Cited

U.S. PATENT DOCUMENTS

| | | | | |
|---|---|---|---|---|
| 2023/0087506 A1* | 3/2023 | Koral | ................... | H04W 24/04 |
| | | | | 455/418 |
| 2023/0091638 A1* | 3/2023 | Medithe | ............... | H04W 72/54 |
| | | | | 709/224 |
| 2023/0179507 A1* | 6/2023 | Maurice | ............... | H04W 24/06 |
| | | | | 709/224 |
| 2023/0247485 A1* | 8/2023 | Dévai | .................. | H04W 28/02 |
| | | | | 370/229 |
| 2023/0291763 A1* | 9/2023 | Soryal | .................... | H04W 4/14 |

OTHER PUBLICATIONS

Malkovich, "An Introduction to Analyzing Twitter Data with R," University of Virginia Library Research Data Services + Sciences, https://data.library.virginia.edu/an-introduction-to-analyzing-twitter-data-with-r/, May 3, 2019, 16 Pages.

Lin, "How to Build a Real-Time Twitter Analysis Application Using Big Data Tools," Towards Data Science, https://towardsdatascience.com/how-to-build-a-real-time-twitter-analysis-using-big-data-tools-dd2240946e64, Dec. 6, 2020, 32 Pages.

\* cited by examiner

| Time | Network related features (anomaly) | | | | | External features (anomaly) | | | Anomaly flag | Decision on Correlation 1: greater than threshold 0: less than threshold | Network related | Non-network related |
|---|---|---|---|---|---|---|---|---|---|---|---|---|
| | $X'[0]=O_{xd}$ | $O_{x1}$ | $O_{x2}$ | $O_{xn}$ | | $Y'[0]=O_{y0}$ | $O_{y1}$ | $Y_m$ | | | | |
| ... | ... | ... | ... | ... | | ... | ... | ... | ... | ... | ... | ... |
| t=i | 0 | 1 | 0 | | | 0 | 1 | 0 | True | 0 | 1 | 0 |
| t=i+1 | 1 | 0 | 0 | | | 1 | 0 | 0 | True | 1 | 0 | 1 |
| t=i+2 | 0 | 0 | 0 | | | 0 | 1 | 0 | False | N/A | 0 | |
| ... | ... | ... | ... | ... | | ... | ... | ... | ... | ... | ... | ... |
| t=T | 0 | 0 | 1 | | | 0 | 0 | 0 | True | N/A | 1 | 0 |

```
┌─────────────────────────────────────────────────────────────────────────────┐
│ Detecting, by network equipment that is part of a radio network and comprising a processor, │
│         that an anomaly has occurred at a cell of the radio network. 802                    │
└─────────────────────────────────────────────────────────────────────────────┘
                                     ↓
┌─────────────────────────────────────────────────────────────────────────────┐
│ Generating, by the network equipment, a correlation matrix that correlates first            │
│ historical network performance data applicable to and measured within the radio network to  │
│ second historical network performance data applicable to the radio network and obtained from│
│            an external source that is not part of the radio network. 804                    │
└─────────────────────────────────────────────────────────────────────────────┘
                                     ↓
┌─────────────────────────────────────────────────────────────────────────────┐
│ Generating, by the network equipment, a correlation threshold matrix that correlates output of │
│ the correlation matrix to first data from a radio network source that is part of the radio network │
│                and second data from the external source. 806                                │
└─────────────────────────────────────────────────────────────────────────────┘
                                     ↓
┌─────────────────────────────────────────────────────────────────────────────┐
│ Based on the correlation threshold matrix, transmitting, by the network equipment to a device │
│   associated with an administrator entity of the radio network, indication data comprising an │
│   indication of a result of determining whether a causation for the anomaly at the radio network │
│ is related to operation of the radio network source or other network equipment, other than the │
│              network equipment, that is part of the radio network. 808                       │
└─────────────────────────────────────────────────────────────────────────────┘
                                     ↓
┌─────────────────────────────────────────────────────────────────────────────┐
│     Determining, by the network equipment, based on the correlation threshold matrix,       │
│ that the first data from the radio network source satisfies a first likelihood function based on a │
│     likelihood of the first data being correlated to the anomaly, or determining, by the network │
│ equipment, based on the correlation threshold matrix, that the second data from the external │
│ source satisfies a second likelihood function based on a likelihood of the second data being │
│                        correlated to the anomaly. 810                                       │
└─────────────────────────────────────────────────────────────────────────────┘
```

FIG. 8

MOBILE NETWORK ANOMALY CLASSIFICATION USING MULTI-DOMAIN DATA CORRELATION

BACKGROUND

Modern cellular systems continue to advance, where various components of a respective network can be disaggregated and/or managed by multiple vendors. In this way, detection of anomalies and determination of root cause of such anomalies can be difficult. An anomaly, being a deviation of a performance parameter from a usual or specified value, can result in varying qualities of service, available access, and/or the like for different user entities of a network, and/or for different vendors of the network.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for determining root cause of a detected anomaly, and more particularly for determining whether such anomaly is being caused by a radio network itself, such as by a device, component, node, cell and/or the like of the radio network, as compared to a cause being external to the radio network.

An example radio system can comprise an upper-level controller that analyzes data comprising first data from a radio network source and second data from an external source that is disposed external to the radio network, and a lower-level controller that is responsive to and provided at a lower level of hierarchy of the radio network than the upper-level controller, wherein the lower-level controller identifies the first data from the radio network source, and wherein the upper-level controller classifies, based on the analysis, whether an anomaly, determined to be occurring in a radio network comprising the radio system, is caused by the radio network.

An example method can comprise generating, by network equipment that is part of a radio network and comprising a processor, a correlation matrix that correlates first historical network performance data applicable to and measured within the radio network to second historical network performance data applicable to the radio network and obtained from an external source that is not part of the radio network. The method further can comprise generating, by the network equipment, a correlation threshold matrix that correlates output of the correlation matrix to first data from a radio network source that is part of the radio network and second data from the external source. The method further can comprise, based on the correlation threshold matrix, transmitting, by the network equipment to a device associated with an administrator entity of the radio network, indication data comprising an indication of a result of determining whether a causation for an anomaly at the radio network is related to operation of the radio network source or other network equipment, other than the network equipment, that is part of the radio network.

An exemplary non-transitory machine-readable medium can comprise executable instructions that, when executed by a processor, of a controller of network equipment of a radio network communicatively coupled to a group of cells of the radio network, facilitates performance of operations. The operations can comprise obtaining, from a cell of the group of cells, a first metric defining a first performance of the cell, obtaining, from an external system disposed external to the radio network, a second metric defining the first performance or a second performance of the radio network, and correlating the first metric to the second metric to determine a root cause of an anomaly at another cell of the cells, wherein the correlating results in output of correlation data representing a result of the correlating of the first metric to the second metric.

An advantage of one or more embodiments of the aforementioned radio system, method and/or non-transitory machine-readable medium can be determining by the radio system a correlation between historical performance data for the radio network and current performance data for the radio network. Another advantage can be determining whether current performance data deviates from the historical performance data, based on the correlation.

Yet another advantage can be determining whether any current performance data satisfies or does not satisfy a threshold related to defined specifications, and thus determining whether any current performance data corresponds to a deviation of a defined specification. Still another advantage can be identifying whether current performance data corresponds to a radio network cause and/or to an external cause.

Yet another advantage of the one or more embodiments described herein can be use of data from external sources, such as from social networks, weather data providers, user entity devices, and/or the like.

Even further, another advantage can be reduction in cost, such as time, energy, manual labor, power and/or the like that is directed to troubleshooting a radio network anomaly, and instead ability to at least partially target a root cause of an anomaly to allow for allocation of resources for addressing the anomaly.

Moreover, in response to anomaly detection, root cause analysis and/or addressing anomalies, satisfaction of user entities of a radio network can be increased, which can lead to greater potentials related to use of the radio network.

BRIEF DESCRIPTION OF THE DRAWINGS

The technology described herein is illustrated by way of example and not limited in the accompanying figures, in which like reference numerals indicate similar elements.

FIG. 7 illustrates an exemplary anomaly detection scenario employing scoring, in accordance with one or more embodiments and/or implementations described herein.

FIG. 8 illustrates a process flow diagram of a method of root cause investigation of an anomaly of the radio network of FIG. 3, in accordance with one or more embodiments and/or implementations described herein.

DETAILED DESCRIPTION

Overview

Figure 1:
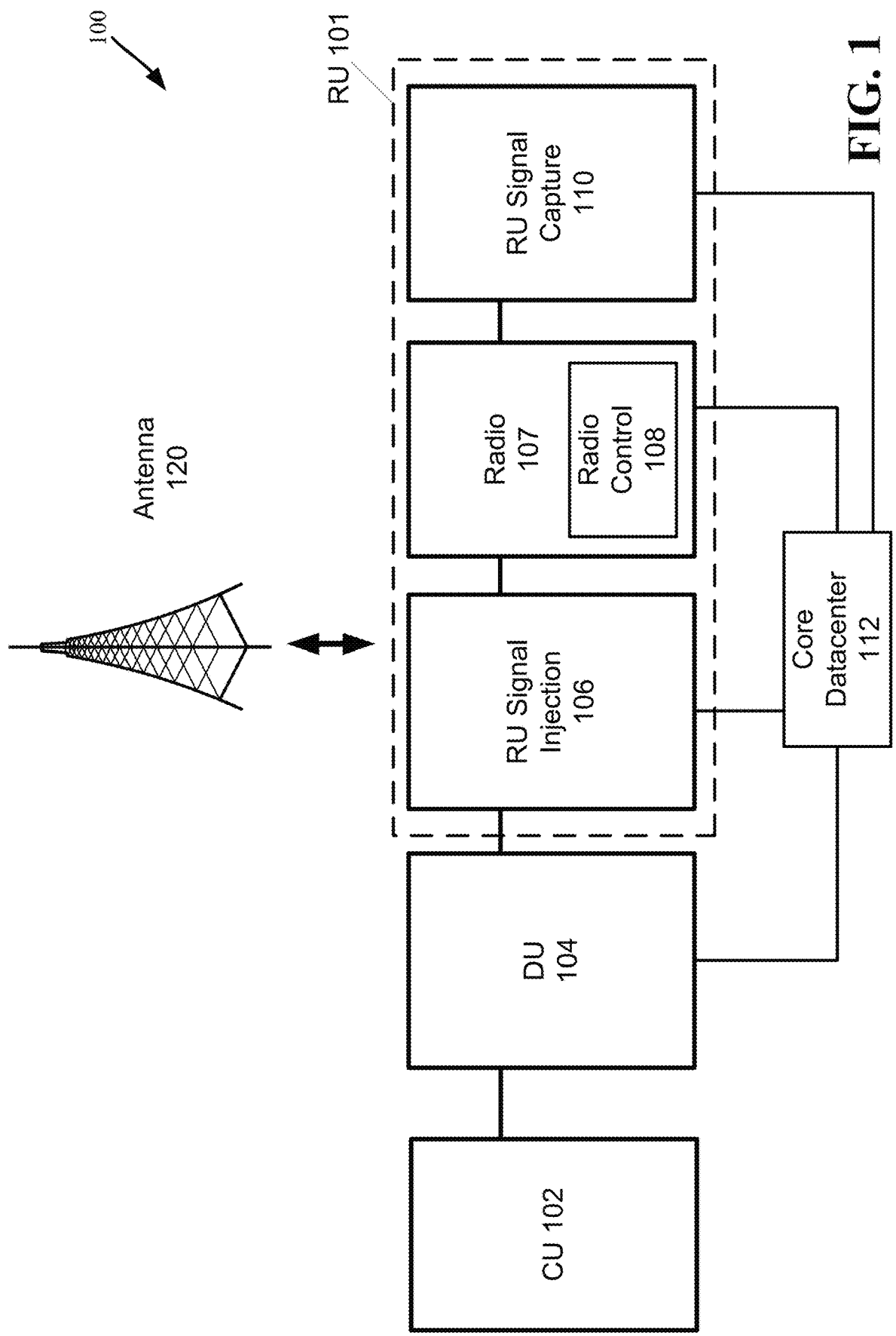
FIG. 1 illustrates a schematic representation of example elements of a radio network, in accordance with one or more embodiments and/or implementations described herein.

The technology described herein is generally directed towards a process to investigate an anomaly of a radio network. The anomaly can be defined as a deviation of a performance parameter and/or defined specification of the radio network, such as compared to one or more defaults, usually observed values and/or historical performances. That is, one or more embodiments described herein can provide for determining root cause of an issue affecting one or more cells of a radio network, such as based on data provided by one or more nodes, cells and/or the like.

In existing frameworks, since O-RAN architecture is based on disaggregated nodes, it can be difficult to determine a root cause of a network anomaly, also herein referred to her as an anomaly, due to the disaggregation, difficulty of sharing information between vendors, different specifications, different architectures and/or the like. Issues and failures with radio networks, such as cellular networks, often can lead to abnormal values in network key performance indicators (KPIs).

Detecting network KPI anomalies can be a useful method to identify potential network issues such as misconfiguration and/or various resource exhaustions. The severity of and/or impacted KPIs can be used to pinpoint an anomaly root cause. Once the root cause is identified, the radio network itself or an entity corresponding to the radio network can take corrective action such as by fixing a configuration and/or deploying extra resources via radio interface controls. What this method ignores is the cause of KPI anomalies may not be the network itself but external.

However, existing frameworks for root cause determination employ a scattered approach that wastes time, resources, manual labor, power. Incorrect positive correlations to network-related factors can be made, unsuitable response actions can be taken and/or response actions can be taken at wrong cells or at wrong times. Further, during such investigation, the anomaly can progress, evolve, move and/or generally continue to cause issue for vendors and/or users (e.g., user entities) of the network.

To account for one or more of these deficiencies, one or more systems, methods and/or non-transitory computer readable mediums are defined herein that can provide root cause analysis based on in-network data provided by network resources, external data provided by sources external to the radio network, historical performance data related to in-network performance, historical performance data based on external source data, and/or the like. Indeed, network parameters can be tightly integrated with non-network parameters, such as weather conditions, or out of norm population movements. Without being limited, external source data can comprise weather data (e.g., weather reports), social network data (e.g., event locations, social network traffic load/demand) and/or user entity data (e.g., user velocity of user entities accessing the radio network).

That is, generally a framework is provided to detect and classify anomalies into network-related and non-network-related classifications. This classifying can aid in avoiding unnecessary troubleshooting, scattered/undirected troubleshoot, and/or the like, and further can aid in an optimized and targeted reaction to such network anomalies. In one or more embodiments, the framework can determine and output a correlation between historical performance data for the radio network and current performance data for the radio network. The framework can determine whether current performance data deviates from the historical performance data, based on the correlation. Further, the framework can, in addition to correlation to historical data, provide additional output for anomaly identification and classification, such as indication data indicating whether any current performance data satisfies or does not satisfy a threshold related to defined specifications. Thus, in one or more embodiments, the framework can determine whether any current performance data corresponds to a deviation of a defined specification. Based on these determinations and data output therefrom, the framework can determine whether current performance data corresponds to a radio network cause and/or to an external cause.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, manual labor, signal power, size, weight and/or the like.

As used herein, the term "resource" can refer to power, money, memory, processing power, bandwidth and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio network architecture is illustrated at 100. The radio system 100 can comprise a central unit (CU) 102, distributed unit (DU) 104 (also herein referred to as a DU portion 104) and a radio unit (RU) 101. The CU 102 can comprise protocol layers and can be responsible for various protocol stack functions. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. In one or more embodiments, the RU signal capture portion 110 can analyze data captured. The DU portion 104 and RU portion 106 can provide data to, and receive data from, the core datacenter 112 and/or central management system.

Figure 2:
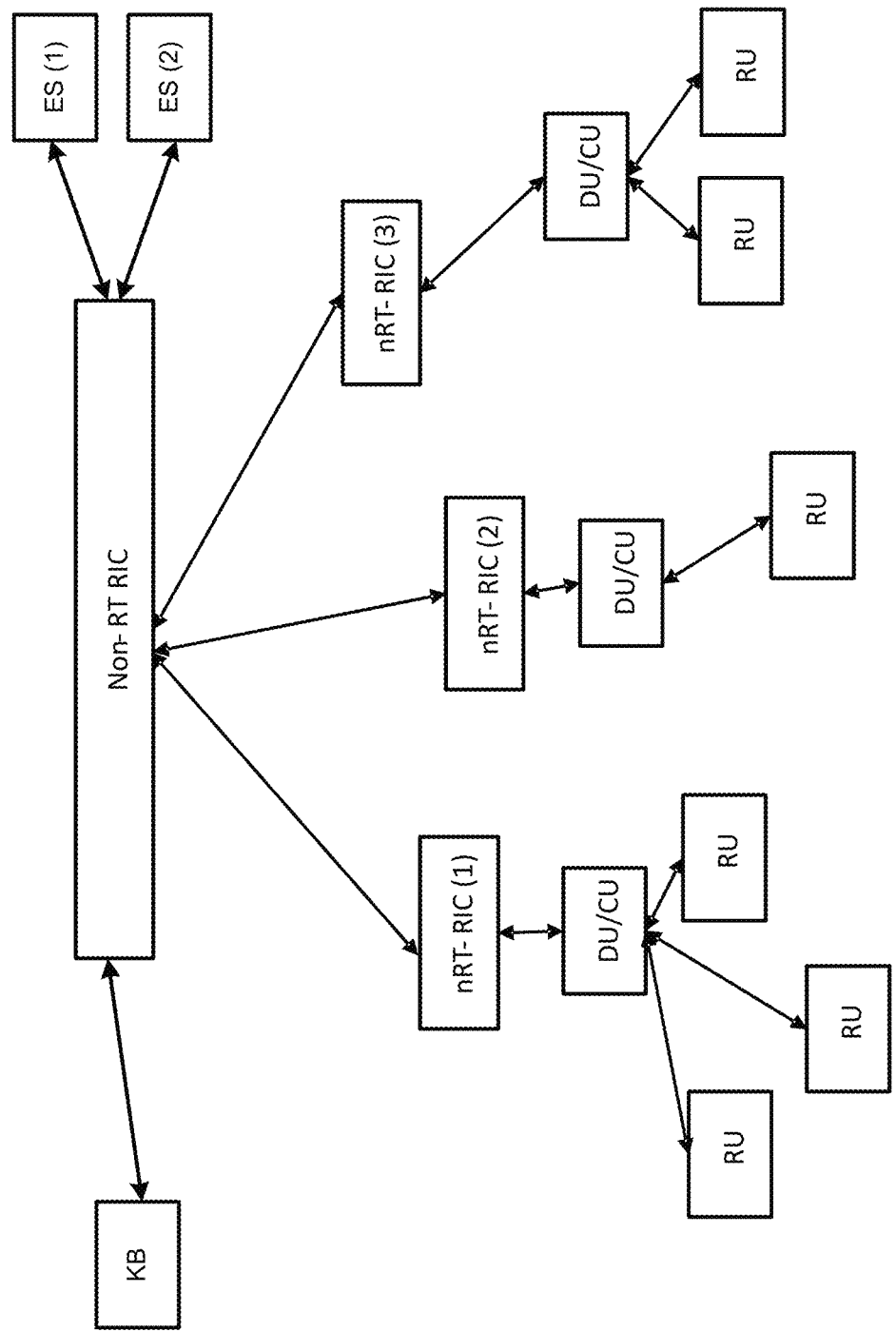
FIG. 2 illustrates an exemplary O-RAN architecture topology of the radio network of FIG. 1, in accordance with one or more embodiments and/or implementations described herein.

Turning next to FIG. 2, an example of another radio network architecture 200 is illustrated, in connection with the high-level radio network architecture 100 of FIG. 1. Comprised by the radio network architecture 200 is an upper-level controller, such as a non-real time radio intelligent controller (Non-RT RIC). A plurality of lower-level controllers, such as near real time radio intelligent controllers (nRT-RICs) are communicatively coupled to and transmit data to the Non-RT RIC. Each nRT-RIC is communicatively coupled to a respective DU/CU to which is respectively communicatively coupled one or more RUs. User entities, such as devices of users, can request access to an RU to obtain access to the radio network architecture 200, also herein referred to her as a radio network 200.

The upper-level Non-RT RIC, as illustrated, is at a higher level of hierarchy than the lower-level nRT-RICs. The lower-level nRT-RICs are responsive to, and can provide information to, the upper-level Non-RT RIC. That is, the nRT-RICs each can oversee and control a plurality of RUs, and can provide particular control to the RUs that can be RU-specific. Differently, the Non-RT RIC can oversee the nRT-RICs and generally can oversee and provide general control of the plurality of RUs communicatively coupled to the various nRT-RICs, such as generally as control of the plurality of RU's as a group.

An anomaly that has occurred at the radio network 200 can, for example, occur at a cell, such as comprising one or more RUs. Generally, based on data from the radio network 200, such as from the RUs and/or nRT-RICs, from one or more external sources (ESs), and/or from historical data accessible by the Non-RT RIC, such as from one or more knowledge databases (KB), a root cause of an anomaly can be investigated and/or at least partially determined.

It is appreciated that one or more other radio networks that can provide one or more operations as will be described herein can have different topology or different architecture. In one or more embodiments, one or more aspects (e.g., nodes) of the network topology 200 can be omitted. In one or more embodiments, one or more additional aspects (e.g., nodes) can be added to a network topology. In one or more embodiments, any one or more connections (e.g., between aspects, such as nodes) can be different.

Figure 3:
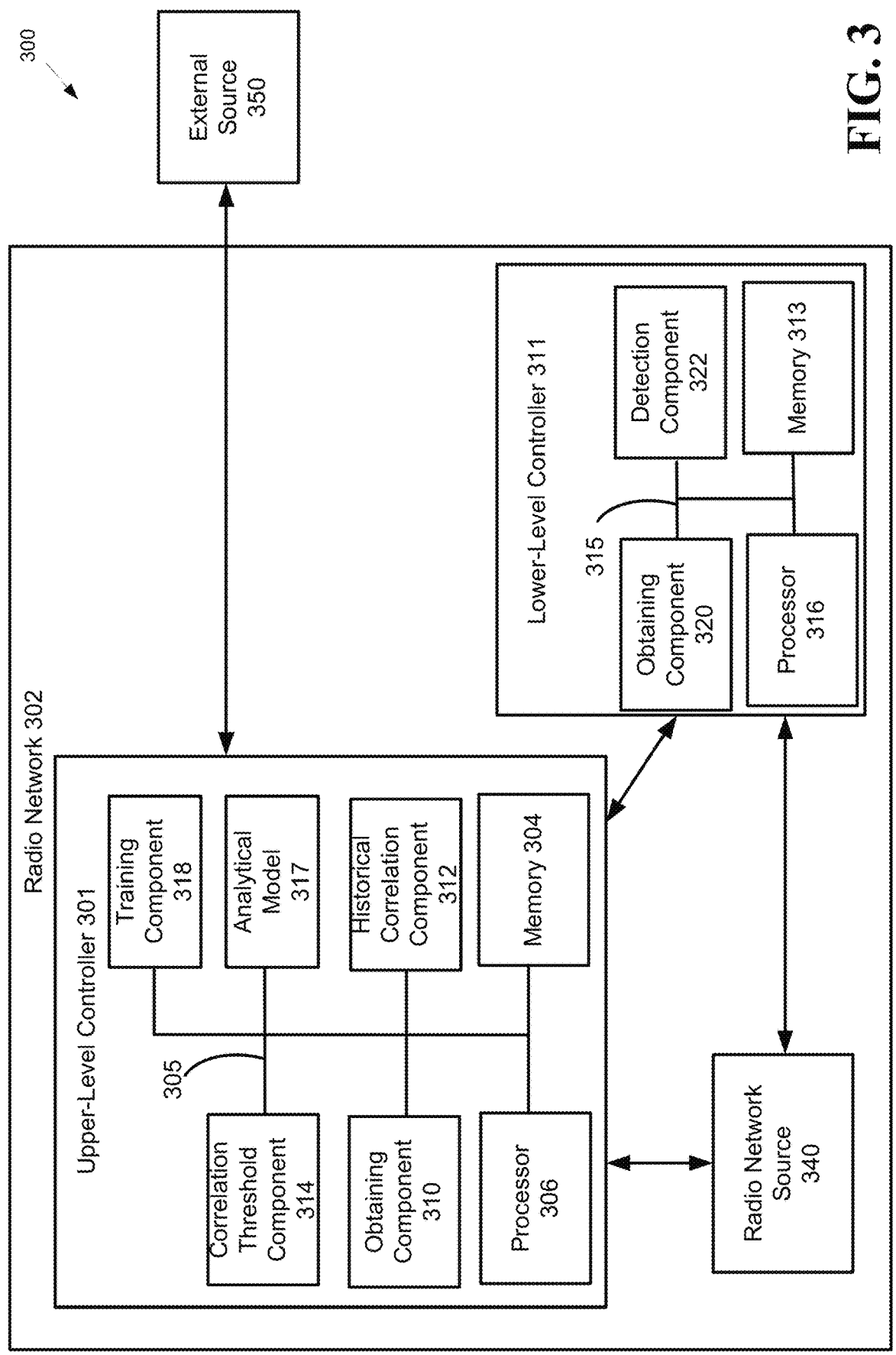
FIG. 3 illustrates a schematic representation of a portions of another radio network, which portions can investigate a root cause of an anomaly that has occurred at the radio network, in accordance with one or more embodiments and/or implementations described herein.

Turning next to FIG. 3, an example non-limiting system 300 is illustrated comprising another exemplary radio network 302 and at least one external source 350. The radio network 302 can be at least communicatively coupled to the external source 350 by any suitable method. The radio network 302 can comprise at least one radio network source 340, such as an RU, or cell comprising one or more RUs, an upper-level controller 301 and a lower-level controller 311. The upper-level controller 301, such as a Non-RT RIC, can comprise a memory 304, bus 305, processor 306, obtaining component 310, historical correlation component 312, correlation threshold component 314, analytical model 317, and/or training component 318. The lower-level controller 311, such as a nRT-RIC, can comprise a memory 313, bus 315, processor 316, obtaining component 320, and/or detection component 322.

Discussion first turns to the processor 306, memory 304 and bus 305 of the upper-level controller 301.

In one or more embodiments, the upper-level controller (ULC) 301 can comprise the processor 306 (e.g., computer processing unit, microprocessor, classical processor and/or like processor). In one or more embodiments, a component associated with ULC 301, as described herein with or without reference to the one or more figures of the one or more embodiments, can comprise one or more computer and/or machine readable, writable and/or executable components and/or instructions that can be executed by processor 306 to facilitate performance of one or more processes defined by such component(s) and/or instruction(s). In one or more embodiments, the processor 306 can comprise the obtaining component 310, historical correlation component 312, correlation threshold component 314, analytical model 317, and/or training component 318.

The processor 306 can be configured to control one or more components/elements of the ULC 301, such as the obtaining component 310, historical correlation component 312, correlation threshold component 314, analytical model 317, and/or training component 318.

In one or more embodiments, the ULC 301 can comprise the machine-readable memory 304 that can be operably connected to the processor 306. The memory 304 can store computer-executable instructions that, upon execution by the processor 306, can cause the processor 306 and/or one or more other components of the ULC 301 (e.g., obtaining component 310, historical correlation component 312, correlation threshold component 314, analytical model 317, and/or training component 318) to perform one or more actions. In one or more embodiments, the memory 304 can store one or more computer-executable components.

ULC 301 and/or a component thereof as described herein, can be communicatively, electrically, operatively, optically and/or otherwise coupled to one another via a bus 305 to perform functions of non-limiting system architecture 300, ULC 301 and/or one or more components thereof and/or coupled therewith. Bus 305 can comprise one or more of a memory bus, memory controller, peripheral bus, external bus, local bus and/or another type of bus that can employ one or more bus architectures. One or more of these examples of bus 305 can be employed to implement one or more embodiments described herein.

In one or more embodiments, ULC 301 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 300 can reside in the cloud, and/or can reside locally in a local computing environment (e.g., at a specified location(s)).

In addition to the processor 306 and/or memory 304 described above, ULC 301 can comprise one or more computer and/or machine readable, writable and/or executable components and/or instructions that, when executed by processor 306, can facilitate performance of one or more operations defined by such component(s) and/or instruction(s).

Turning now to the processor 316, memory 313 and bus 315 of the lower-level controller (LLC) 311, in one or more embodiments, the LLC 311 can comprise the processor 316 (e.g., computer processing unit, microprocessor, classical processor and/or like processor). In one or more embodiments, a component associated with LLC 311, as described herein with or without reference to the one or more figures of the one or more embodiments, can comprise one or more computer and/or machine readable, writable and/or executable components and/or instructions that can be executed by processor 316 to facilitate performance of one or more processes defined by such component(s) and/or instruction(s). In one or more embodiments, the processor 316 can comprise the obtaining component 320 and/or detection component 322.

The processor 316 can be configured to control one or more components/elements of the LLC 311, such as the obtaining component 320 and/or detection component 322.

In one or more embodiments, the LLC 311 can comprise the machine-readable memory 313 that can be operably connected to the processor 316. The memory 313 can store computer-executable instructions that, upon execution by the processor 316, can cause the processor 306 and/or one or more other components of the LLC 311 (e.g., obtaining component 320 and/or detection component 322) to perform one or more actions. In one or more embodiments, the memory 313 can store one or more computer-executable components.

LLC 311 and/or a component thereof as described herein, can be communicatively, electrically, operatively, optically and/or otherwise coupled to one another via a bus 315 to perform functions of non-limiting system architecture 300, LLC 311 and/or one or more components thereof and/or coupled therewith. Bus 315 can comprise one or more of a memory bus, memory controller, peripheral bus, external bus, local bus and/or another type of bus that can employ one or more bus architectures. One or more of these examples of bus 315 can be employed to implement one or more embodiments described herein.

In one or more embodiments, LLC 311 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 300 can reside in the cloud, and/or can reside locally in a local computing environment (e.g., at a specified location(s)).

In addition to the processor 316 and/or memory 313 described above, LLC 311 can comprise one or more computer and/or machine readable, writable and/or executable components and/or instructions that, when executed by processor 316, can facilitate performance of one or more operations defined by such component(s) and/or instruction(s).

Turning now to additional elements of the ULC 301 and the LLC 311, direction first turns to the ULC 301, and still to FIG. 3.

Generally, the obtaining component 310 can obtain first data from a radio network source 340 or another radio network source, such as the LLC 311 itself, which can be considered a radio network source of the radio network 302. The first data can comprise performance data, such as current performance data or real time performance data, of the respective radio network source, of another radio network source, of user entities accessing the radio network source, of the radio network generally, and/or the like. The first data can be in any suitable format and can comprise metadata.

The obtaining component 310 further can obtain second data from one or more external sources, e.g., external source 350, that is external to and not comprised by the radio network 302. The external source 350 can comprise, without being limited thereto, a weather component, weather device, social network, social network device, and/or user entity (e.g., user device). The second data can comprise data, such as current or real time data, that is respectively related to performance of the radio network 302. For example, weather data can comprise data defining weather patterns, social network data can comprise events and/or social network access patterns, and/or user entity data can comprise velocity data and/or other movement data of user entities, such as those accessing the radio network 302. The second data can be in any suitable format and can comprise metadata.

In one or more embodiments, the obtaining component 310 can identify one or more metrics (e.g., parameters, context, values and/or the like) that define the anomaly. For example, such data can be transmitted to the ULC 301 by an LLC, such as the LLC 311, communicatively coupled to and/or comprised by a cell of the radio network 302 at which the anomaly has occurred. It is noted that the anomaly still can be occurring, and thus analysis discussed herein can be performed in real time (e.g., during occurrence of the anomaly). For example, an anomaly can be determined by a performance metric at a cell of the radio network 302, which performance metric has changed by at least a defined deviation from a specification for the performance metric.

The obtaining component 310 can obtain, such as receive, determine, locate, look up and/or the like, the first data, the second data and/or the metrics defining the anomaly.

Generally, the ULC 301 can analyze data comprising the first data and the second data, and can classify, based on the analysis, whether an anomaly, determined to be occurring in the radio network 302 is caused by the radio network 302. For example, the ULC 301 can correlate the first data from the radio network source 340/311 and the second data from the external source 350 to the metrics defining the anomaly.

In one example, the historical correlation component 312 can generate a correlation matrix, to be further described below, that can correlate first historical performance data from the radio network to second historical performance data related to network performance from the external source 350. In this way, the historical correlation component 312 can analyze the matrix and output indication data indicating if relationships are found between any of the first data, second data, first historical performance data, and/or second historical performance data.

The correlation threshold component 314 can generate a correlation threshold matrix that correlates output of the correlation matrix to the first data from the radio network source and the second data from the external source 350. In this way, the correlation threshold component 314 can determine whether the first data from the radio network source and/or the second data from the external source 350 satisfies a function of the correlation threshold matrix. As used herein, the function can be related to and/or define a likelihood of causality to one or more metrics defining the anomaly. For example, based on analysis of the correlation threshold matrix, the ULC 301, such as the correlation threshold component 314, can determine that the first data from the radio network source satisfies a first likelihood function based on a likelihood of the first data being correlated to the anomaly, or can determine that the second data from the external source 350 satisfies a second likelihood function based on a likelihood of the second data being correlated to the anomaly.

It is noted that the one or more likelihood functions can further be based on one or more thresholds for performance, e.g., for one or more KPIs, of the radio network 302. Thus, the thresholds can define limits as to allowable deviation of one or more KPIs from a norm, specified and/or default value and/or range. In one or more embodiments, a threshold can be provided by an administrator entity, such as via a device of the administrator entity communicatively coupled to the radio network 302, such as to the ULC 301. In one or more additional and/or alternative embodiments a threshold can be determined by the correlation threshold component 314, such as based on aggregation of the first historical data for the radio network 302.

In one or more embodiments, the ULC 301 can comprise an analytical model 317. The analytical model 317 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised, self-supervised, semi-self-supervised and/or unsupervised. For example, the analytical model 317 can comprise a ML model.

The analytical model 317 generally can accordingly analyze known data, such as historical data from an external source and/or radio network source, such as stored at a suitable knowledge base communicatively coupled to the radio network 302. In one or more cases, the analytical model 317 can make a determination as to whether a root cause of an anomaly is related to the radio network itself and/or to an external source external to the radio network, based on current (e.g., dynamic and/or real time) and/or historical data at the one or more KB s.

For example, the analytical model 317 can be employed by the historical correlation component 312 to determine one or more correlations between the first data, second data, first historical performance data and/or second historical performance data, employed by the correlation threshold component 314 to determine one or more thresholds, and/or employed by the correlation threshold component 314 to determine a likelihood the one or more aspects of the data analyzed (e.g., the first data and/or the second data) is related to a root cause of an anomaly that has occurred at the radio network 302.

Alternatively, it will be appreciated that the radio network 302 can function absent use of the analytical model 317, such as based on comparison of data from the KB s by the historical correlation component 312 and correlation threshold component 314.

Generally, the analytical model 317 can be trained, such as by the training component 318, on a set of training data that can represent the type of data for which the system will be used. That is, the analytical model 317 can be trained on historical data related to network performance and/or on historical data related to external occurrences, such as those that have affected network performance.

A suitable KB can be disposed at the radio network 302 and/or external to the radio network 302. Such KB can be updated upon determination by the ULC 301 that a previously known KPI metric has changed, that an unknown external source cause has been identified, that an unknown radio network source cause has been identified, and/or that any unknown data has been identified, such as on which the analytical model 317 has not yet been trained, such as by the training component 318.

In this way, the information at the KB can be maintained and updated dynamically, such as automatically, by the ULC 301, such as being updated by the training component 318.

It is noted that the KB and/or the analytical model 317 can be updated at any suitable frequency, such as a regular frequency, upon demand, or upon determination of new data, such as by the training component 318 and/or other component of the ULC 301.

Turning now to the LLC 311, the obtaining component 320 can obtain first data from another radio network source, such as the radio network source 340, an RU, and/or the like, and/or from the LLC 311 itself. For example, the detection component 322 can actively search for and/or request data regarding network KPIs from RU/DU/CU components communicatively coupled to the LLC 311.

Figure 4:
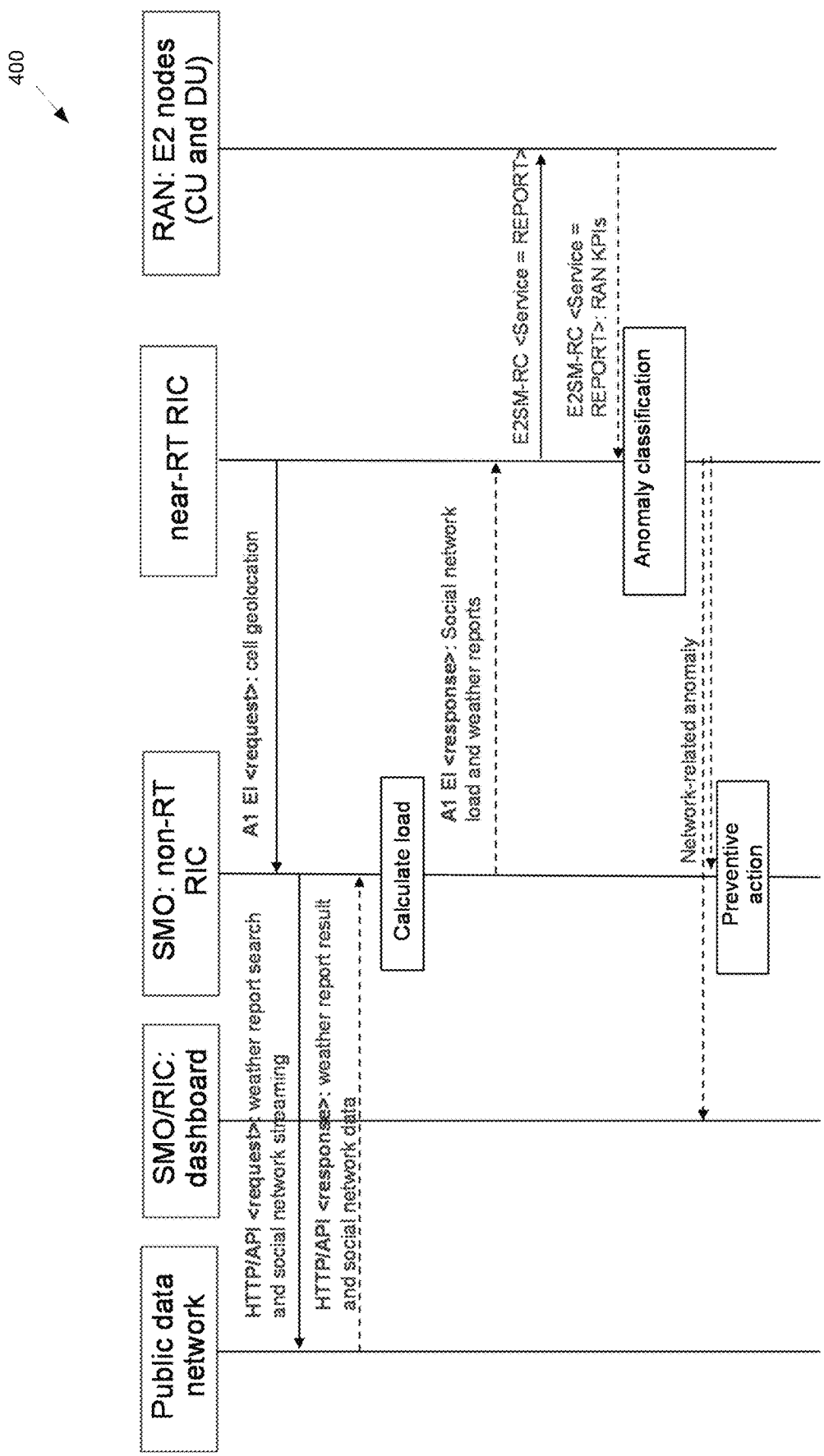
FIG. 4 illustrates signaling diagram for O-RAN anomaly classification using external data sources, such as by the radio network of FIG. 3, in accordance with one or more embodiments and/or implementations described herein.

In view of general understanding of the radio network 302, direction now turns to FIG. 4 in addition to still referring to FIG. 3. FIG. 4 illustrates a signaling diagram 400 for O-RAN anomaly classification using both internal data sources and external data sources, such as by the radio network 302 of FIG. 3. One or more elements, objects and/or components referenced in the signaling diagram 400 can be those of radio network 100, 200 and/or architecture 300. Repetitive description of like elements and/or processes employed in respective embodiments is omitted for sake of brevity. Likewise, the processes and/or operations of the signaling diagram 400 also can be applicable to the radio network 100, 200 and/or architecture 300.

Generally, as illustrated at FIG. 4, multi-domain data can be employed for classifying anomalies as network-related or non-network related in an ORAN network, such as the radio network 302. The term multi-domain can refer to the fact that input data to the classification processes, steps and/or algorithms can comprise non-network related environmental and/or social behavior data indicators. As shown, such indicators can comprise weather reports, social network streaming, user entity geolocation, and/or the like.

Data can be collected at network edge (E2 nodes) and transmitted to near-RT RICs (e.g., a LLC 311), such as via an E2 interface. As used herein, an E2 interface can connect near real-time RIC in the ORAN architecture with E2 nodes, which may include CU, DU, and/or next generation Node B (gNB). Batch data can be shared with a non-RT RIC (e.g., a ULC 301), such as via an A1 interface, for keeping historical records and developing classification processes, steps and/or algorithms. An A1 interface can enable communication between two RICs: Non-realtime RIC and near-realtime-RIC. An A1 interface can allow sharing of policies, data, and/or analytical models between these two RICs.

The network data can comprise multiple KPIs, resource utilizations, and/or the like (e.g., the first data). In order to detect and classify anomalies into network-related and non-network related, the external network data can comprise weather information, user velocity, and/or social network traffic. That is, human and environment factors and/or events that can cause a temporary anomaly in the monitored network can be considered by the one or more components of the ULC 301. Such example information can be shared over an A1 interface from a near-RT-RIC to service management and orchestration (SMO) for global processing.

An advantage of the signaling processes illustrated at the diagram 400 can be isolation of possible network configuration and/or upgrade issues and/or determination of normal behavior under circumstances. Further correlation with external network indicators can help with root cause analysis of network KPI anomalies and/or with taking corrective action to certain network function in anticipation or to address an anomaly that has occurred.

Figure 5:
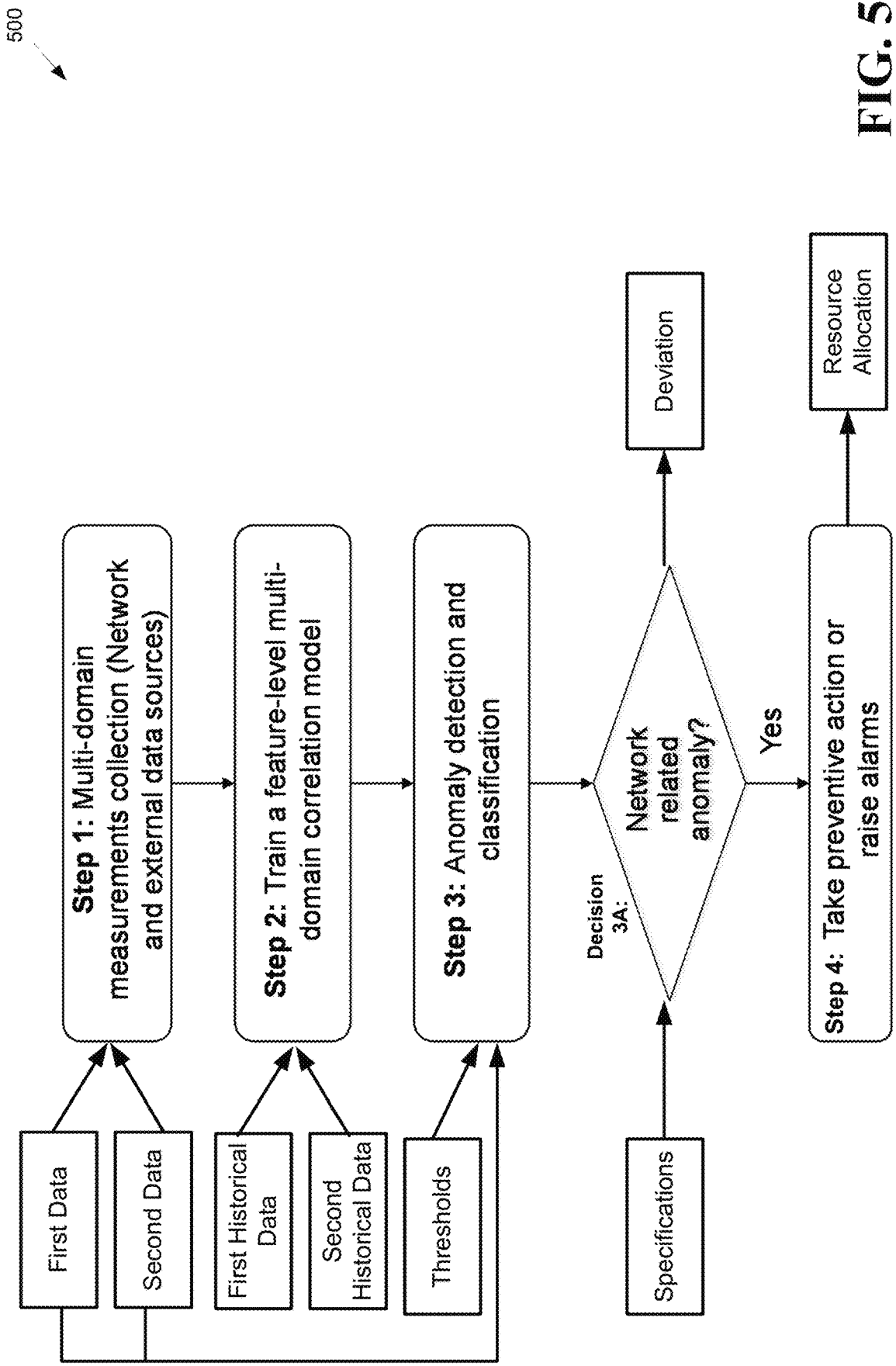
FIG. 5 illustrates a high-level flow chart of processes that can be performed by the radio network as depicted at FIG. 3, in accordance with one or more embodiments and/or implementations described herein.
Figure 6:
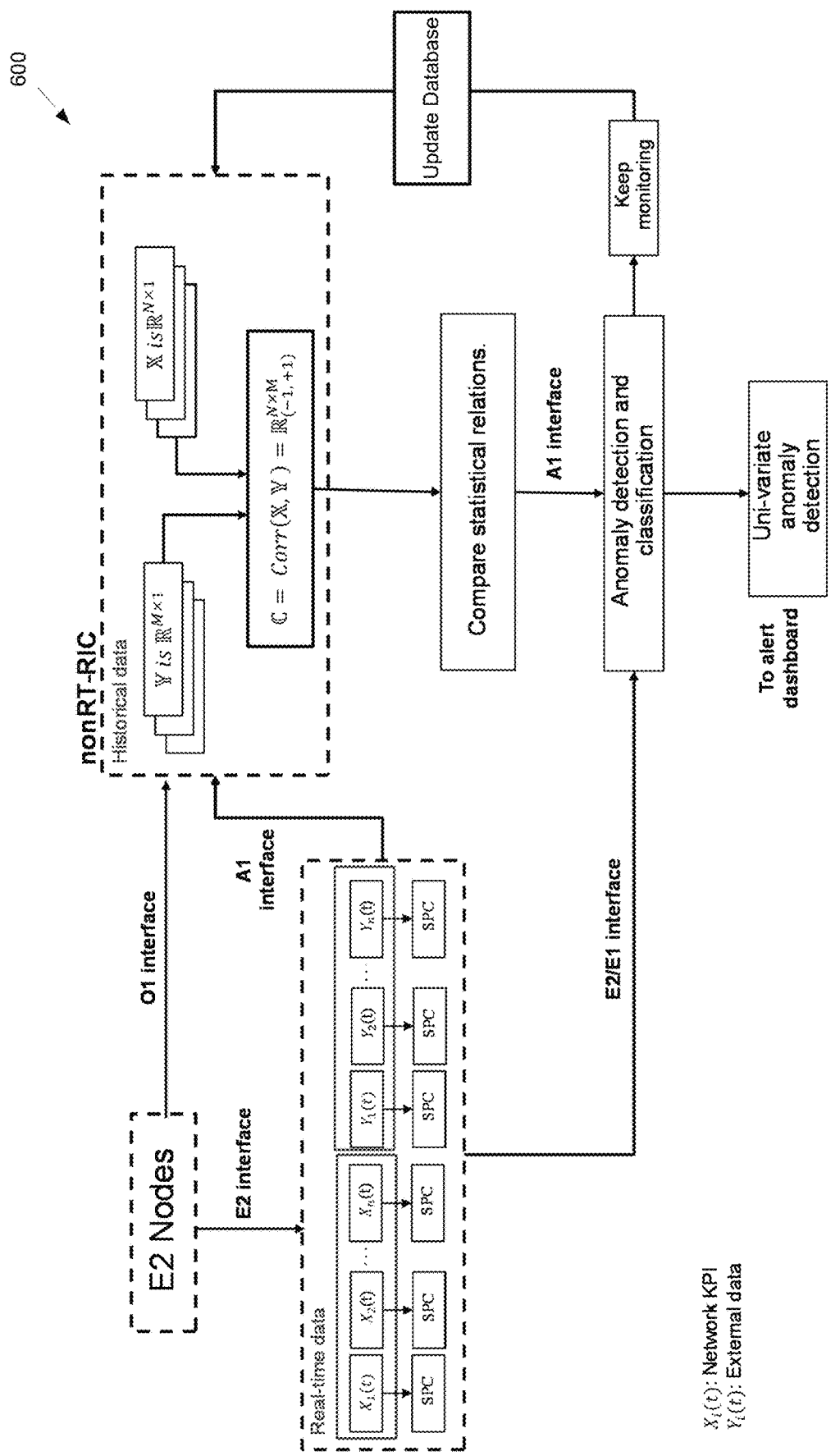
FIG. 6 illustrates a schematic of one or more processes, inputs and/or outputs related to one or more operations of the radio network of FIG. 3, in accordance with one or more embodiments and/or implementations described herein.

To provide further illustration of how the one or more processes and/or operations discussed above relative to FIGS. 3, 4 and 5 can be provided and/or executed, direction next turns to FIGS. 5 and 6. Turning first to FIG. 5, illustrated is a high-level process flow schematic 500 illustrating one or more processes that can be performed by the radio network 302 of FIG. 3.

At schematic 500, a series of high-level steps are illustrated. One or more elements, objects and/or components referenced in the schematic 500 can be those of radio network 100, 200 and/or architecture 300. Repetitive description of like elements and/or processes employed in respective embodiments is omitted for sake of brevity. Likewise, the processes and/or operations of the schematic 500 also can be applicable to the radio network 100, 200 and/or architecture 300.

Step 1 can comprise collecting data from different sources (multi-domain) to be used in anomaly detection and prediction in the next steps. The data can comprise both first data such as network counters (e.g., user throughput) and second data such as from external sources, such as user speed or social events.

Step 2 can comprise generating and training a model for classifying an anomaly as a network-related or not-network related using historical baseline values for both network and external counters (e.g., first historical data and second historical data), and further using anomalies in external data. The model, such as analytical model 317 and/or a model comprised by the ULC 301 (e.g., comprised by the historical correlation component 312 and/or the correlation threshold component 314) can calculate correlation coefficients and correlation thresholds between multi-domain data. As used herein, anomalies in external data can refer to a significant shift in the observed external data from a value that is normally expected. For example, an anomaly in external data can be measured mathematically using relevant distribution from historical data points and can be measured if the observed value is statistically non-significant.

Step 3 can comprise detecting a current anomaly at the radio network, and classifying the anomaly as either network related (e.g., for which operator entity troubleshooting can be employed) or as related to external sources (e.g., temporary traffic jam) using one or more correlation matrices of Step 2.

Decision 3A can comprise specifically determining if a network anomaly is related to a network root cause. If yes, the processes can move to Step 4. An output of Decision 3A can be data indicating particular deviation of one or more particular specifications (e.g., KPIs) of the radio network.

Step 4 can comprise taking preventive action and/or raising alarms, such as allocating one or more resources to a cell having exhibited the anomaly.

Turning next to FIG. 6, a schematic 600 of one or more processes, inputs and/or outputs that can be employed by the ULC 301 (e.g., by the historical correlation component 312, the correlation threshold component 314, and/or the analytical model 317) to make the anomaly root cause determination of Decision 3A (FIG. 5). One or more elements, objects and/or components referenced in the schematic 600 can be those of radio network 100, 200 and/or architecture 300. Repetitive description of like elements and/or processes employed in respective embodiments is omitted for sake of brevity. Likewise, the processes and/or operations of the schematic 600 also can be applicable to the radio network 100, 200 and/or architecture 300.

Relative to the illustration at FIG. 6, and related to Step 1 of the schematic 500, a network topology can comprise geographical location of cells, vendor and software versions of each network function (NF), and inter-NF link capacities. Network performance measurement (PM) counters can comprise, but are not limited to, total amount of transmitted bits (b), slots with data transmitted OTA (t), time duration between packet transmission and feedback (d), number of transmitted packets (n), number of users-per-cell, and CU/DU server utilization. Network KPIs can comprise, but are not limited to, throughput=$b_i/\Delta T$ (where $\Delta T=t_0-t_n$), delay=$d_i/n_i$, physical resource block (PRB) utilization, and/or block error rate (BLER-rate). Baseline KPIs can comprise average values of throughput and delay KPIs defined by an operator entity and/or administrator entity, such as based on historical PM counter data (e.g., first historical data).

External data is that data that is provided by sources external to the network. Such non-network data can cause an anomaly in the network, such as of a network KPI. Such external data can comprise use entity (UE) mobility, weather reports and/or social network load, without being limiting. UE mobility can be calculated using UE's GPS information, such as reported by third generation partnership project (3GPP) defined minimization driving test (MDT). UE mobility data can be used to detect if there is a traffic jam which can cause a temporary degradation in network performance, which can be a network anomaly and/or lead to a network anomaly. Weather report data can comprise humidity, temperature, rainy days, storm patterns, and/or the like. Social network load data can be measured from traffic load of defined quality of service class identifier/5G quality of service identifier (QCI/5QI) or from deep packet inspection on the core network to identify the IP address of social network websites and/or detect the amount of traffic thereof. As used herein, 5QI can be an indicator that represents the level of quality of service desired for certain data units. This can allow for identification of data networks and general type of contents carried by the data networks. As used herein, a core network can be a backbone network that connects a radio network (RAN) and users (e.g., user entities) to wider internet services and/or other operator networks, such as including social network sites, weather stations, and/or the like. A core network can monitor and identify the IP address(es) of respective data network names (DNNs).

Additionally and/or alternatively, social network traffic analysis can be provided through text mining, such as an application and/or software that can count number of tweets, updates, status updates and/or the like, such as tagged to a certain location. This data can be used to detect if network performance degradation is due to occasional social events or breaking news, for example.

Relative to Step 2, generally, the ULC 301 can calculate a correlation coefficient between the network KPIs and external sources and a threshold for classifying an anomaly as non-network related. General outputs of step 2 can be both a Correlation matrix $\mathbb{C} = \mathbb{R}_{(-1,+1)}^{N \times M}$ and a Correlation threshold Matrix $\mathbb{H}_{(-1,1)}^{N \times M}$, where N is the total number of network-related parameters and M is the total number of external-source parameters. That is, generally, the ULC 301 can check if an anomaly in network KPI $X_i$ can be correlated to an external source anomaly $Y_j$ using historical data.

Step 2 can be broken in to a number of substeps 2.1 and 2.2.

Step 2.1 can comprise creating a correlation matrix, such as by the historical correlation component 312, between network and non-network features from historical data, such as at the non-RT RIC (e.g., ULC 301). This can comprise choosing correlation coefficients from the following:

for linearly related parameters, use Pearson correlation:

$$c_{xy} = \frac{\text{cov}(x, y)}{SD_x \times SD_y};$$

or for non-linear parameters, use Spearman correlation:

$$c_{xy} = \frac{\text{cov}(\text{rank}_x, \text{rank}_y)}{SD(\text{rank}_x) \times SD(\text{rank}_y)}.$$

Additionally and/or alternatively, other correlation coefficients can be used where suitable.

Next, $\mathbb{C}$ can be the correlation matrix of dimension $\mathbb{R}_{(-1,+1)}^{N \times M}$, such that $\mathbb{C} = \text{Corr}(\mathbb{X}, \mathbb{Y})$ where correlation type is selected based on the choice of correlation coefficients.

Next, Step 2.2 can comprise generating the correlation threshold matrix, such as by the correlation threshold component 314. This can comprise generating a correlation threshold matrix $\mathbb{H}$ (where $\mathbb{H}$ is $\mathbb{R}_{(-1,1)}^{N \times M}$). Elements $h_{x,y}$ are correlation threshold between $x \in \mathbb{X}$ and $y \in \mathbb{Y}$). Matrix $\mathbb{H}$ can aid in determining a degree of strength between any given feature x and y in later Step 3.2 (e.g., anomaly classification). One method of maintaining Matrix $\mathbb{H}$ can be to input from field experts. Other forms can use machine learning, such as employing an analytical model 317.

As indicated at schematic 500, Step 3 next comprises anomaly detection and classification. Step 3 can be broken into Step 3.1: real time anomaly detection for network parameters, such as at the nRT RIC (e.g., LLC 311) and Step 3.2: anomaly classification.

Step 3.1 (real time anomaly detection for network parameters) can comprise calculating upper/lower bound and thresholds, such as using historical data (e.g., first historical data and second historical data). For example, the following sub-steps can be employed:

a. For dataset $X = \{X_1, X_2, \ldots, X_i \ldots X_n\}$ with feature $X_i$; and b. For each $X_i \in X$:
1. → Calculate upper bound ($X_i^{Qu}$=95%) and lower bound ($X_i^{Ql}$=5%) percentiles from historical data.
2. → Inter-quartile-distance $(X_i^{IQD}): X_i^{Qu} - X_i^{Ql}$ (eq. 1), and
3. → for threshold $X_i^{D\text{-}thresh} = V$, where $V \in \mathbb{R}^+ \geq 2$ (e.g. $V \in \{2, 2.5, 3, 3.5, 4\}$):
   i. → $X_i^{upperbound} = Q_u - (X_i^{D\text{-}thresh} \times X_i^{IQD})$, and
   ii. → $X_i^{lowerbound} = Q_l + (X_i^{D\text{-}thresh} \times X_i^{IQD})$.

With respect to the above sub-steps of Step 3.1:

X indicates the set of $X_n$, where $X_1, X_2, \ldots X_n$ are the network related features, $X_i^{Qu}, X_i^{Ql}$ are the upper and lower bound percentiles of feature $X_i$, respectively, $X_i^{IQD}, X_i^{D\text{-}thresh}$ are Inter-quartile distance, and threshold for IQD for feature X_i, $\mathbb{R}^+$ shows a positive real number, V is a vector of $\mathbb{R}^+$, $O_{Xi}(t)$ is a binary variable for any feature $X_i$ such that it is 1 if the feature shows an anomaly, or 0 if feature behaves normally, and $O_{Xi}(t)$ is calculated based on the fact that if the feature's value lies outside the lower and upper bound which are depicted as $X_i^{lowerbound}$ and $X_i^{upperbound}$, respectively.

Next, an initialization sub-step can comprise:

a. For each feature $X_i \in \mathbb{X}$ initialize the following variables:

→ Outlier_index $O_{Xi}(t) = 0$, where $O_{Xi} \in \{0, 1\}$

Next, a feature level anomaly detection sub-step can comprise:

a. At time t, for each $X_i \in X$:

b. $O_{Xi}(t)$ equals to 1 if there is anomaly detected in feature $X_i$; and equals 0 otherwise c. $O_{Xi}(t)=1$, when $(X_i(t) < X_i^{lowerbound}$ OR $X_i(t) > X_i^{upperbound})$ else 0

Step 3.2 (anomaly classification) can comprise employing input of the threshold matrix $\mathbb{H}$ (where $\mathbb{H}$ is $\mathbb{R}_{(-1,1)}^{N \times M}$). Elements $h_{x,y}$ is a correlation threshold between $x \in \mathbb{X}$, and $y \in \mathbb{Y}$). For example, the following sub-steps can be employed:

a. Create $\mathbb{X}'$ as network-relate anomaly flag table, $\mathbb{X}' \in \mathbb{Z}_2^{N \times 1}$ b. Create $\mathbb{Y}'$ as non-network related anomaly flag table $\mathbb{Y}' \in \mathbb{Z}_2^{M \times 1}$ c. Set network related flag=false d. Anomaly Flag=0, Non-Network anomaly Flag=0 e. For $i \in N @ t$
1. $\mathbb{X}'[i] = O_{Xi}(t), \mathbb{Y}'[i] = O_{Yi}(t)$ f. If $\Sigma_{i=0}^n O_{X_i(t)} \geq 1$ and $\Sigma_{i=0}^m O_{Y_i(t)} \geq 1$
1. Network Anomaly Flag=1,
2. $\forall((x=1 \in \mathbb{X}')$ and $(y=1 \in \mathbb{Y}'))$
   i. For Positive correlation between x and y: IF C (x, y)$\geq$h(x, y))
      A. Non-Network Flag=1, Network Anomaly Flag=0
   ii. For Negative correlation between x and y: IF C (x, y)$\leq$h(x, y))

A. Non-Network Flag=1, Network Anomaly Flag=0
   iii. Else
      A. Non-Network Flag=0
g. Else if $\Sigma_{i=0}^n O_{X_i(t)} \geq 1$ and $\Sigma_{i=0}^m O_{Y_i(t)} = 0$
   1. Anomaly Flag=1, Non-Network Flag=0
h. ELSE
   1. Anomaly Flag=0, Non-Network Flag=0

Regarding FIG. 6, the E2 nodes can collect data which can be stored in the non-RT RIC for historical purposes. Data sharing between E2 nodes (i.e. CU, DU, RU, or gNB) can take place over an O1 interface. Data collected in non-RT RIC can be used for training the model to detect anomalies.

In the deployment/real-time phase, E2 nodes additionally can collect data and share with the anomaly detection and classification block in the real-time. This can be done over an E2 interface and the anomaly detection classification block can be located within the nRT-RIC. The data collected by the E2 nodes in the real-time also can be updated in the non-RT RIC to update the model with latest development in the traffic scenarios.

The results of the anomaly detection and classification block can be transmitted to any dashboard. The results also can be sent to update the database, such as of the non-RT RIC.

Turning now to FIG. 7, an exemplary anomaly detection scenario employing scoring is illustrated. In one or more embodiments, the illustrated scoring, and/or similar, can be displayed to and/or otherwise communicated to an administrator entity to provide data detailing anomalous activity at the radio network.

Particularly illustrated is where an anomaly has occurred or not, such as if anomaly does occur, if the cause of anomaly is any external source (such as any social event or weather condition), or if the cause of the anomaly is a network-related event.

'Anomaly Flag' indicates 1 if there is an anomaly in any of the network-related KPI irrespective of any external event. It flags 0 when ALL network related KPI behaves normally, even if external factors behave in anomalous fashion (e.g. even under extreme weather conditions, but network behaves normally).

The Decision on Correlation column indicates 1, when there is an anomaly in any of the network KPI and the correlation between the network-event and non-network-related event is above certain threshold as shown at Step 3, above. It indicates 0 otherwise. In case there is no anomaly in any of the network's KPI or non-network-related factors, it is a N/A for this column.

The second-to-last column 'Network related' shows 1 if the anomaly is in fact due to network-related KPI and 0 otherwise.

The final column 'Non-Network related' shows 1 if the anomaly is in fact due to non-network-related parameter and 0 otherwise.

Turning now to FIG. 8, a process flow comprising a set of operations is illustrated relative to FIG. 3, in accordance with one or more embodiments described herein. One or more elements, objects and/or components referenced in the process flow 800 can be those of the non-limiting system 300. Repetitive description of like elements and/or processes employed in respective embodiments is omitted for sake of brevity. Likewise, the processes and/or operations of the process flow 800 also can be applicable to the non-limiting system 300.

At operation 802, the method 800 can comprise detecting, by network equipment that is part of a radio network and comprising a processor (e.g., obtaining component 310), that an anomaly has occurred at a cell of the radio network.

At operation 804, the method 800 can comprise generating, by the network equipment (e.g., historical correlation component 312), a correlation matrix that correlates first historical network performance data applicable to and measured within the radio network to second historical network performance data applicable to the radio network and obtained from an external source that is not part of the radio network.

At operation 806, the method 800 can comprise generating, by the network equipment (e.g., correlation threshold component 314), a correlation threshold matrix that correlates output of the correlation matrix to first data from a radio network source that is part of the radio network and second data from the external source.

At operation 808, the method 800 can comprise, based on the correlation threshold matrix, transmitting, by the network equipment (e.g., processor 306), to a device associated with an administrator entity of the radio network, indication data comprising an indication of a result of determining whether a causation for the anomaly at the radio network is related to operation of the radio network source or other network equipment, other than the network equipment, that is part of the radio network.

At operation 810, the method 800 can comprise determining, by the network equipment (e.g., analytical model 317), based on the correlation threshold matrix, that the first data from the radio network source satisfies a first likelihood function based on a likelihood of the first data being correlated to the anomaly, or determining, by the network equipment (e.g., analytical model 317), based on the correlation threshold matrix, that the second data from the external source satisfies a second likelihood function based on a likelihood of the second data being correlated to the anomaly.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams/schematics 400, 500, 600 and/or 800 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, provided is a radio system that can comprise an upper-level controller that analyzes data comprising first data from a radio network source and second data from an external source that is disposed external to the radio network, and a lower-level controller that is responsive to and provided at a lower level of hierarchy of the radio network than the upper-level controller, where the lower-level controller identifies the first data from the radio network source, and where the upper-level controller classifies, based on the analysis, whether an anomaly, determined to be occurring in a radio network comprising the radio system, is caused by the radio network. The upper-level controller can correlate the first data from the radio network source and the second data from the external source to metrics defining the anomaly. An advantage of one or more embodiments of the aforementioned radio system, method and/or non-transitory machine-readable medium can be determining by the radio system a correlation between historical performance data for the radio network and current performance data for the radio network. Another advantage can be determining whether current performance data deviates from the historical performance data, based on the correlation.

Yet another advantage can be determining whether any current performance data satisfies or does not satisfy a threshold related to defined specifications, and thus determining whether any current performance data corresponds to a deviation of a defined specification. Still another advantage can be identifying whether current performance data corresponds to a radio network cause and/or to an external cause.

Yet another advantage of the one or more embodiments described herein can be use of data from external sources, such as from social networks, weather data providers, user entity devices, and/or the like.

Even further, another advantage can be reduction in cost, such as time, energy, manual labor, power and/or the like that is directed to troubleshooting a radio network anomaly, and instead ability to at least partially target a root cause of an anomaly to allow for allocation of resources for addressing the anomaly.

Moreover, in response to anomaly detection, root cause analysis and/or addressing anomalies, satisfaction of user entities of a radio network can be increased, which can lead to greater potentials related to use of the radio network.

A practical application of the systems, computer-implemented methods and/or non-transitory computer-readable mediums described herein can be real time analysis of current performance metrics, such as current values for KPIs, in correspondence with data from one or more sources external to the radio network. Overall, such computerized tools can constitute a concrete and tangible technical improvement in the field of radio network diagnostics, without being limited thereto.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide dynamic and real time radio network anomaly analysis, as compared to existing systems and/or techniques. Systems, computer-implemented methods and/or computer program products facilitating performance of these processes are of great utility in the fields of radio network diagnostics and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze radio network KPI metrics, historical data and real time data in the time that one or more embodiments described herein can facilitate these processes. And, neither can the human mind nor a human with pen and paper electronically perform one or more of these processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
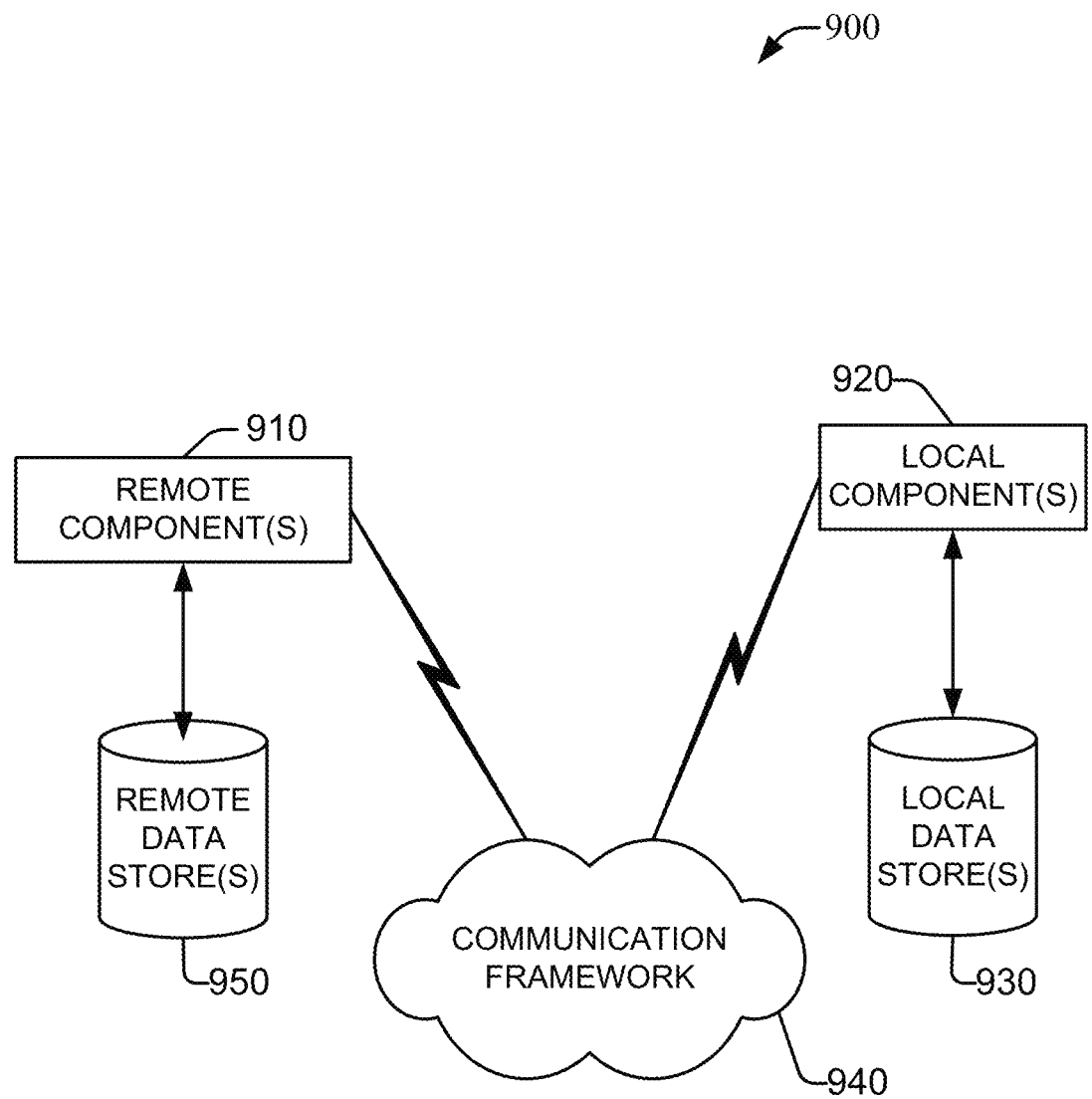
FIG. 9 illustrates a block diagram of an example operating environment with which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
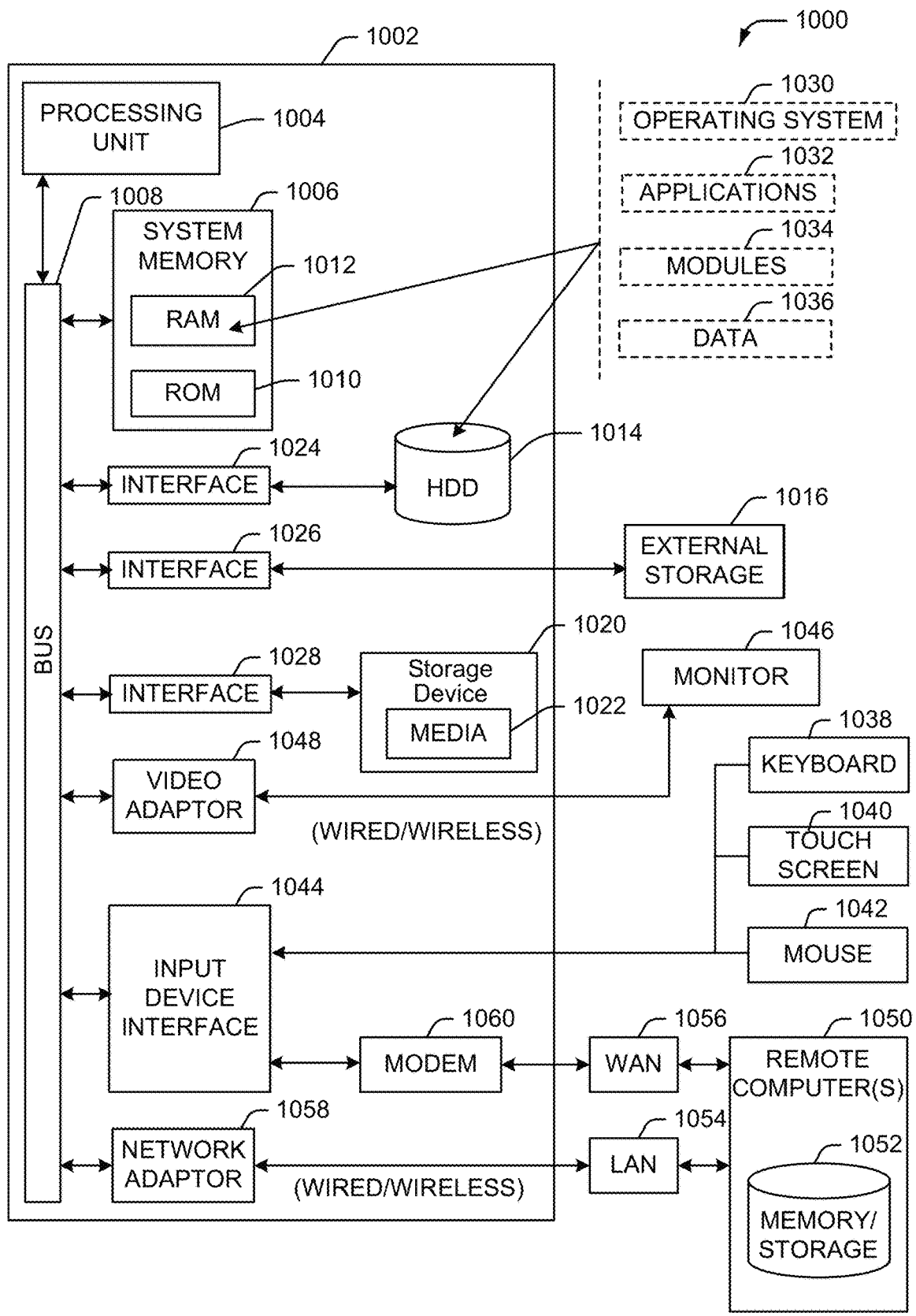
FIG. 10 illustrates an example schematic block diagram of a computing environment with which the subject matter described herein can interact and/or be implemented at least in part.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in the computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A radio system, comprising:
an upper-level controller that analyzes data comprising first data from a radio network source and second data from an external source that is disposed external to the radio network; and
a lower-level controller that is responsive to and provided at a lower level of hierarchy of the radio network than the upper-level controller,
wherein the lower-level controller identifies the first data from the radio network source
wherein the upper-level controller classifies, based on the analysis, whether an anomaly, determined to be occurring in a radio network comprising the radio system, is caused by the radio network, and
wherein the upper-level controller generates a correlation matrix that correlates first historical performance data from the radio network to second historical performance data related to network performance from the external source.

2. The radio system of claim 1, wherein the upper-level controller correlates the first data from the radio network source and the second data from the external source to metrics defining the anomaly.

3. The radio system of claim 1, wherein the upper-level controller is a non-real time radio intelligent controller, and wherein the lower level controller is a near real time radio intelligent controller at a cell of the radio network.

4. The radio system of claim 1, wherein the anomaly being determined to be occurring comprises determining that a performance metric at a cell of the radio network has changed by at least a defined deviation from a specification for the performance metric.

5. The radio system of claim 1, wherein the lower-level controller is a first lower-level controller, and wherein the first lower-level controller or a second lower-level controller of the radio network has identified the anomaly as occurring at a cell of the radio network.

6. The radio system of claim 1, further comprising:
generating, by the upper-level controller, a correlation threshold matrix that correlates output of the correlation matrix to the first data from the radio network source and the second data from the external source; and
determining, by the upper-level controller, that the first data from the radio network source or the second data from the external source satisfies a function of the correlation threshold matrix.

7. The radio system of claim 6, further comprising:
determining, by the network equipment, based on the correlation threshold matrix, that the first data from the radio network source satisfies a first likelihood function based on a likelihood of the first data being correlated to the anomaly; or
determining, by the network equipment, based on the correlation threshold matrix, that the second data from the external source satisfies a second likelihood function based on a likelihood of the second data being correlated to the anomaly.

8. The radio system of claim 1, further comprising:
transmitting correlation data describing the anomaly, and based on the correlation matrix, to an administrator device of an administrator entity of the radio network.

9. The radio system of claim 1, wherein the second historical performance data comprises at least one of weather metrics pertaining to weather, social network metrics pertaining to performance of a social network, or user equipment metrics pertaining to performance of user equipment via the radio network.

10. A method, comprising:
generating, by network equipment that is part of a radio network and comprising a processor, a correlation matrix that correlates first historical network performance data applicable to and measured within the radio network to second historical network performance data applicable to the radio network and obtained from an external source that is not part of the radio network;
generating, by the network equipment, a correlation threshold matrix that correlates output of the correlation matrix to first data from a radio network source that is part of the radio network and second data from the external source; and
based on the correlation threshold matrix, transmitting, by the network equipment, to a device associated with an administrator entity of the radio network, indication data comprising an indication of a result of determining whether a causation for an anomaly at the radio network is related to operation of the radio network source or other network equipment, other than the network equipment, that is part of the radio network.

11. The method of claim 10, further comprising:
determining, by the network equipment, based on the correlation threshold matrix, that the first data from the radio network source satisfies a first likelihood function based on a likelihood of the first data being correlated to the anomaly; or
determining, by the network equipment, based on the correlation threshold matrix, that the second data from the external source satisfies a second likelihood function based on a likelihood of the second data being correlated to the anomaly.

12. The method of claim 10, further comprising:
detecting, by the network equipment, that the anomaly has occurred at a cell of the radio network.

13. The method of claim 10, wherein the anomaly comprises a deviation of a performance metric at a cell of the radio network, as compared to a specified value for the performance metric.

14. The method of claim 10, wherein the second data from the external source comprises at least one of weather data representative of a weather condition, social network data representative of content communicated via a social network, or radio network user device mobility data representative of locations of user devices authorized to access network services enabled via the radio network.

15. The method of claim 10, further comprising:
allocating, by the network equipment, or requesting, by the network equipment, allocation of, resources at a cell of the radio network at which the anomaly has occurred to address the anomaly, wherein the result of the determining whether the causation for the anomaly at the radio network is that the causation is related to the operation of the radio network source or the other network equipment that is part of the radio network.

16. A non-transitory machine-readable medium, comprising executable instructions that when executed by a processor, of a controller of network equipment of a radio network communicatively coupled to a group of cells of the radio network, facilitates performance of operations comprising:
obtaining, from a cell of the group of cells, a first metric defining a first performance of the cell;
obtaining, from an external system disposed external to the radio network, a second metric defining the first performance or a second performance of the radio network
correlating the first metric to the second metric to determine a root cause of an anomaly at another cell of the cells, wherein the correlating results in output of correlation data representing a result of the correlating of the first metric to the second metric; and
correlating the first metric and the second metric respectively to first historical performance data representing historical performance of the radio network obtained from the group of cells and second historical performance data representing historical performance of the radio network obtained from the external source.

17. The radio network of claim 16, wherein the operations further comprise:
transmitting the correlation data to an administrator device of an administrator entity of the radio network.

18. The radio network of claim 16, wherein the operations further comprise:
determining whether the correlation data satisfies a threshold for metric performance, wherein satisfaction of the threshold for metric performance is indicative of the first metric being below a first specification for the first metric or the second metric being below a second specification for the second metric.

19. The radio network of claim 18, wherein the second metrics comprise at least one of weather metrics pertaining to weather, social network metrics pertaining to performance of a social network, or user equipment metrics pertaining to performance of user equipment via the radio network.

20. The radio network of claim 16, wherein the operations further comprise:
   allocating, or requesting allocation of, a resource at the other cell to address the anomaly.

* * * * *